A. R. TRIST.
METALLIC PACKING.
APPLICATION FILED MAY 18, 1916.
1,282,498.
Patented Oct. 22, 1918.
2 SHEETS—SHEET 1.
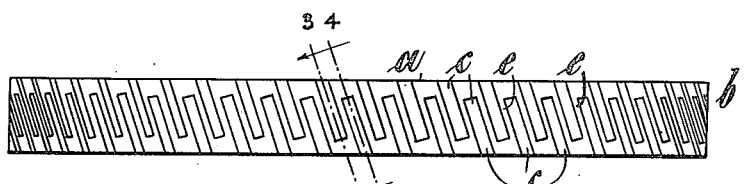
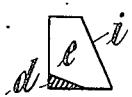
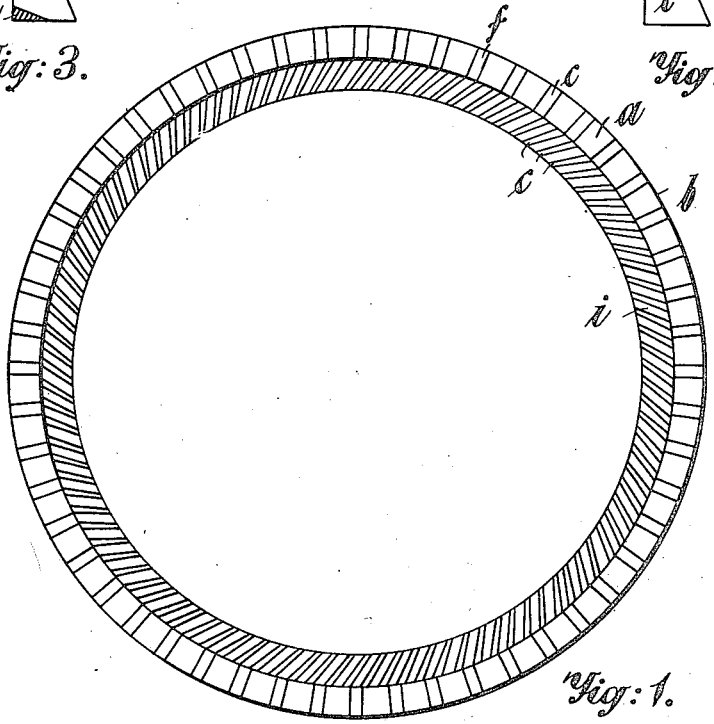
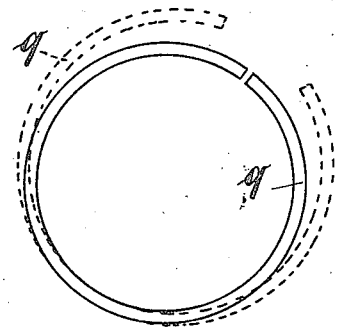
Inventor
Arthur Ronald Trist
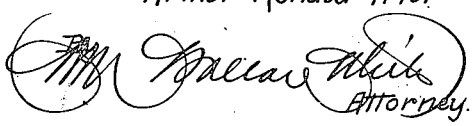

A. R. TRIST.
METALLIC PACKING.
APPLICATION FILED MAY 18, 1916.

1,282,498.

Patented Oct. 22, 1918.
2 SHEETS—SHEET 2.

Inventor
Arthur Ronald Trist

Attorney

UNITED STATES PATENT OFFICE.

ARTHUR RONALD TRIST, OF LONDON, ENGLAND.

METALLIC PACKING.

1,282,498.   Specification of Letters Patent.   Patented Oct. 22, 1918.

Application filed May 18, 1916. Serial No. 98,252.

*To all whom it may concern:*

Be it known that I, ARTHUR RONALD TRIST, subject of the King of Great Britain and Ireland, residing at Coronation House, 4 Lloyds avenue, in the city of London, England, have invented new and useful Improvements in Metallic Packings, of which the following is a specification.

This invention relates to improvements in metallic packings of that class having an endless ring provided with cuts or recesses alternately disposed on each side of the ring to give resiliency and has for its object the production of such a packing having a much greater degree of efficiency and a lower co-efficient of friction than obtains with metallic packings at present known.

In the past packings formed of fibrous materials have been largely used owing to their capacity for adaptation, their ready adjustment when necessary to prevent leakage and their low first cost but they have the great disadvantage of rapidly deteriorating in use owing to attrition of the working surfaces and a comparatively high co-efficient of friction particularly when they receive unskilled attention. The efficiency of such a packing is largely due to the number of minute interstices which exist between the individual fiber composing the packing and which serve to retain lubricant and debris of attrition owing to its viscosity rendering its ejection by the effective pressure impossible. Metallic packings on the other hand do not deteriorate so much from wear and have a lower co-efficient of friction but with the exception of those formed of shredded metal do not readily accommodate themselves to the surfaces on which they act owing to their rigid character. Such packings reduce the number of interstices and consequently when wear takes place considerable leakage is involved owing to the moving parts traveling a considerable distance apart and leaving conduits of considerable cross section as compared with those involved in fibrous packings.

This invention consists in the arrangement of a band of metal whose resilience and elasticity is insured by the provision of a plurality of cuts so arranged that while not sub-dividing the band entirely destroy its rigidity, and in order to nullify the effect of the width of the cuts and effectively reduce them to the smallest possible dimension and thus introduce an interstice comparable with those existing in fibrous packings I fill each cut up with a suitable bearing substance preferably under pressure which will not be disintegrated or broken down in structure by heat. It will thus be seen that if any definite limit of wear is decided on the number of cuts can be so proportioned that until that limit is exceeded no interstice will be formed, having a cross section larger than that found to be allowable with lubricant of a given viscosity to permit passage of fluid under pressure.

The active surface of the said band of metal is formed so as to closely contact with the surface with which it is to co-act while the remainder of the surfaces are so formed that pressure may be readily applied to maintain said contact fairly across the surface of the band.

In order that the invention may be the better understood I will now proceed to describe the same in relation to the accompanying drawing reference being had to the letters and figures marked thereon. Like letters refer to like parts in the various figures, in which:—

Figure 1 illustrates in plan view a ring constructed according to my invention.

Fig. 2 is an elevation of the ring illustrated in Fig. 1.

Fig. 3 is a section on the line 3—3 of Fig. 2 looking in the direction of the arrow.

Fig. 4 is a section on the line 4—4 of Fig. 2 looking in the direction of the arrow.

Fig. 6 illustrates in part sectional elevation a double acting piston with two rings and Fig. 7 is a detail view of one of the elements of construction illustrated in Figs. 5 and 6.

Figure 5:
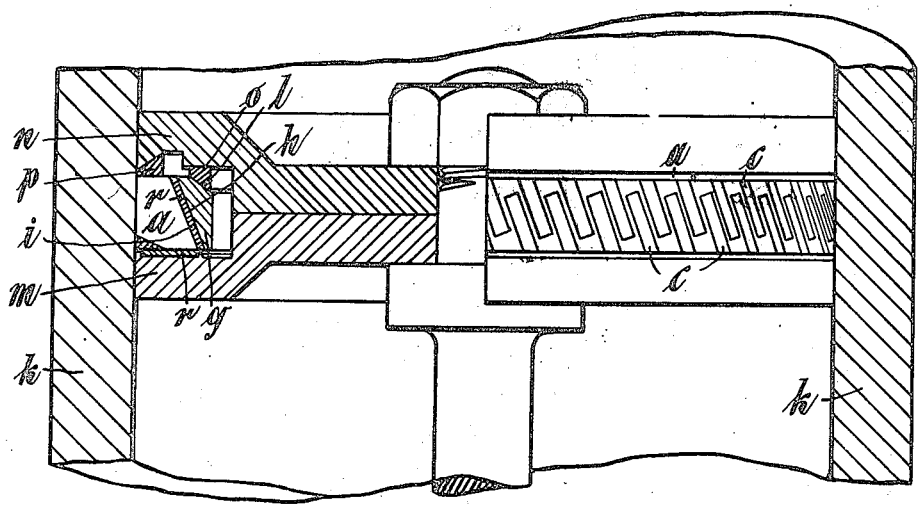
Fig. 5 illustrates in part sectional elevation a single acting piston having one of my rings in position.

Referring to Figs. 1, 2, 3 and 4 which illustrate one form of my invention it will be seen that the ring *a* is of trapezoidal cross section so disposed as to provide a perfectly cylindrical outer peripheral surface *b* for contact with the cylinder walls.

To provide the requisite resilience a plurality of saw cuts *c c* are made obliquely, alternately from opposite edges and of such a depth as to leave a minimum of material in the junctions *d d* between the adjacent bars *e e* formed by the said saw cuts *c c*. Upon examination of Figs. 3 and 4 it will be seen that the substantially triangular junction areas *d* are of similar size, form, and relative disposition to the vertical axis of the ring *a* thereby insuring regular expansion of the said ring *a*. In the commercial production of such a ring as indicated it is obvious that it is impossible to use saws sufficiently thin to produce a cut so narrow as to effectively prevent passage of fluid under pressure, therefore I make the saw cuts *c* of such a width as is commercially convenient and then fill up the said saw cuts *c* with some suitable antifriction substance, applying pressure to the said substance if necessary or desirable. By this means a ring *a* is produced whose outer periphery has alternate bars of metal *e* and antifriction bearing substance *f* (Fig. 2), the narrow junction *d* being also of the same material as the ring *a*.

In use an unbroken ring *g* is disposed within the ring *a* the said ring *g* having a surface *h* which is adapted to contact and co-act with the surface *i* of the ring *a* to uniformly expand the same and maintain it in close relation to the cylinder wall *k* upon the application of pressure to its upper surface *l*.

The rings *a* and *g* are disposed between two abutments *m* and *n*, the abutment *m* serving to support the ring *a* while the abutment *n* co-acts with the spring *o* which exerts pressure on the upper surface *l* of the ring *g*.

The abutment *n* already referred to may also co-act with a spring *p* which is adapted to exert pressure on the ring *a* and maintain it firmly upon the abutment *m* so as to prevent pressure leaking through the joint between *a* and *m*. To economize space as much as possible I have selected the form of spring illustrated in Fig. 7 for the springs *o* and *p*. This type of spring comprises a divided ring *q* normally of greater diameter than its operative diameter, in Fig. 7 the operative diameter is indicated by full lines, while the normal diameter is shown in dotted lines. It will therefore be seen that the ring when in position is under initial stress tending to expand its diameter which acting on the oblique surfaces produces pressure upon the ring *a* to expand it circumferentially in the case of the spring *o* and to press it downward upon the abutment *m* in the case of the spring *p*.

In some cases I may provide a packing ring of fibrous material *r* between the ring *a* and the ring *g* as also between the ring *a* and the abutment *m* to form a fluid tight joint at these parts.

Figure 6:
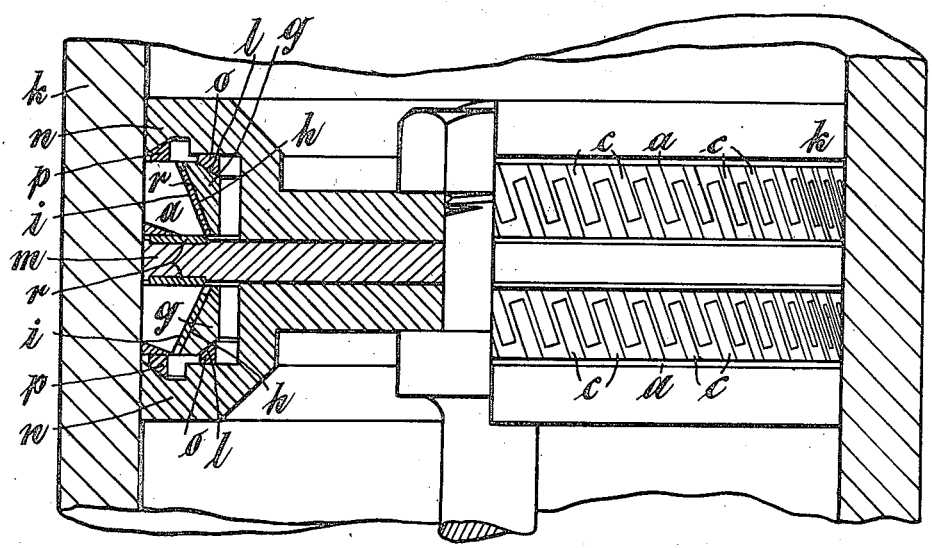

The arrangement shown in Fig. 5 which is termed the "single acting" arrangement may be used for "double acting" operation for moderate pressures but for high pressures I prefer to use the arrangement as shown in Fig. 6 in which there is a packing ring for the pressure on each side of the piston. The construction in this latter figure is a duplicate of that in Fig. 5, the only difference being the provision of a double faced abutment member *m* which is made detachable to facilitate the assembly of the parts of the piston. Although I have shown the parts of the piston held together by a nut on the end of the piston rod it is obvious other equivalent means may be adopted for the purpose.

It must be understood that when the piston is put into the cylinder in which it is to work the diameter of said piston should just fit the cylinder slidingly while the bearing material within the interstices is gripped closely and tightly therein.

This filling material may be an antifriction metal or a material which has to a certain extent lubricating characteristics; it may be cast or pressed into the interstices or each interstice may be filled with a piece of the exact dimensions required.

I claim:—

1. A packing for pistons and the like comprising a packing ring of the required diameter having a series of cuts therein extending alternately from each edge of the ring toward the other edge, said cuts extending partly across the outer surface and completely across the inner surface of said ring so as to leave a uniform section of metal connecting the adjacent bars to one another at each end thereof for the purposes described, suitable bearing material disposed in said cuts so as to completely fill the same, a ring of smaller diameter fitting within said packing ring, and having a wedge shaped cross-section tapering in a direction parallel to the axis of the ring, said smaller ring having its larger end beveled toward the center of the ring, and a resilient expansible ring within and bearing radially outward against the beveled surface of said ring, thereby causing the latter to exert a wedging action to expand the resilient packing ring.

2. A packing for pistons and the like comprising a complete ring of the required diameter to exactly fit the cylinder in which it is to work and having a series of cuts therein extending alternately from each edge of the ring toward the other edge, said cuts extending partly across the outer surface and completely across the inner surface of said ring so as to leave a portion of the ring at the end of each cut of substantially triangular section of uniform area bearing material inserted into each cut to completely fill the same and resilient means carried by the piston for forcing the said ring against the walls of the cylinder, substantially as described.

In testimony whereof I have signed my name to this specification in the presence of a subscribing witness.

ARTHUR RONALD TRIST.

Witness:
  WALTER CARVER.